Figure 1:
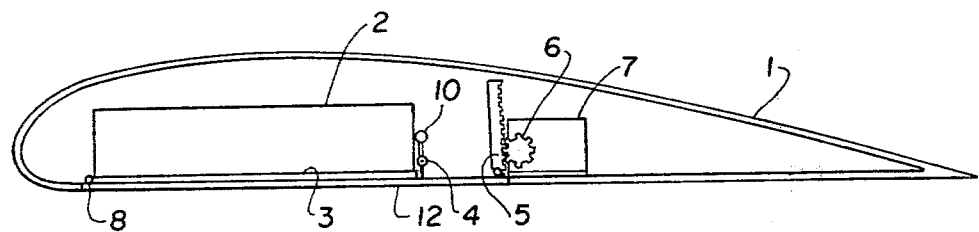

United States Patent [19]

Muscatell

[11] 4,253,626
[45] Mar. 3, 1981

[54] EMERGENCY FUEL DUMP DEVICE FOR AIRCRAFT

[76] Inventor: Ralph P. Muscatell, 2007 NE. 20th Ave., Fort Lauderdale, Fla. 33305

[21] Appl. No.: 948,144

[22] Filed: Oct. 3, 1978

[51] Int. Cl.² .............................................. B64D 37/20
[52] U.S. Cl. .................................. 244/135 R; 244/136
[58] Field of Search ................. 244/94, 135 R, 135 B, 244/135 C, 136

[56] References Cited

U.S. PATENT DOCUMENTS

| 1,753,068 | 4/1930 | Ross ........................................ 244/94 |
| 1,893,584 | 1/1933 | Fritsche ................................. 244/94 |
| 2,573,207 | 10/1951 | Lipman .............................. 244/135 R |
| 2,629,680 | 2/1953 | Henry ................................. 244/135 R |

FOREIGN PATENT DOCUMENTS

| 342084 | 12/1918 | Fed. Rep. of Germany ...... 244/135 R |
| 739931 | 8/1943 | Fed. Rep. of Germany ...... 244/135 R |
| 636411 | 4/1928 | France ................................. 244/135 R |

Primary Examiner—Galen L. Barefoot

[57] ABSTRACT

The emergency fuel dump device for aircraft is simply a trap door on the underside of the wing. The door serves as the bottom portion of the fuel tank within the wing. It is hinged at the front and fastened with a quick release at the rear. To dump all the fuel in a wing tank the quick release is activated allowing the door to swing open.

1 Claim, 3 Drawing Figures

U.S. Patent    Mar. 3, 1981    4,253,626

EMERGENCY FUEL DUMP DEVICE FOR AIRCRAFT

BRIEF SUMMARY OF THE INVENTION

The Emergency Fuel Dump Device For Aircraft is a trap door on the under-side of the aircraft wing. The door is part of the bottom portion of the fuel tank within the wing, and is part of the bottom surface of the exterior of the underside of the wing. The trap door is hinged on the edge closest the leading edge of the wing and fastened with a 'quick release' latch on the edge toward the trailing edge of the wing. A suitable gasket around the edge of the door mates with a suitable surface around the tank providing seal.

Upon dire emergency such as a loss of engine power on takeoff, or a wing fuel cell fire, the release of the weight of the fuel, or the fuel which is fueling a fire in minimum time is critical. The fuel load may be Dumped in the minimum time possible by activating the quick release latch allowing the bottom of the fuel tank to swing open. The door opening and subsequent closing to be assisted by a motor active mechanism.

If a crash landing is inevitable dumping the fuel beforehand increases maneuverability of the aircraft, and lessens the probability of fire. In the case of a wing fuel cell fire on the top surface of the wing combustion and heat destroy the airfoil function-and therefore the lift on that wing. It is therefore absolutely imperative that the fuel be dumped in the quickest possible time in order to extinguish the fire and prevent loss of-or restore the airfoil function to the wing. The invention herein described allows these objectives to be accomplished.

FIG. 1. FIG. 1. depicts a wing (I.) edge on view with fuel tank (2) and the trap door (12) in closed configuration. Continious hinge (8), gasket (3). Latching eyelets (4) with slidable shaft (I0) and curved pins (II). A motor (7) drives gear (6) which inturn moves bar with mating teeth (5), thus trap door (12) is opened and closed.

Figure 2:
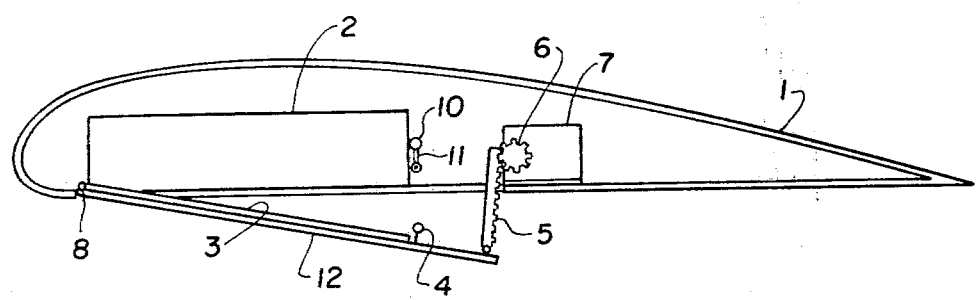

FIG. 2 FIG. 2 depicts the wing (I) and fuel tank assembly (2) as FIG. 1, but with the trap door (12) in open or dumping configuration.

Figure 3:
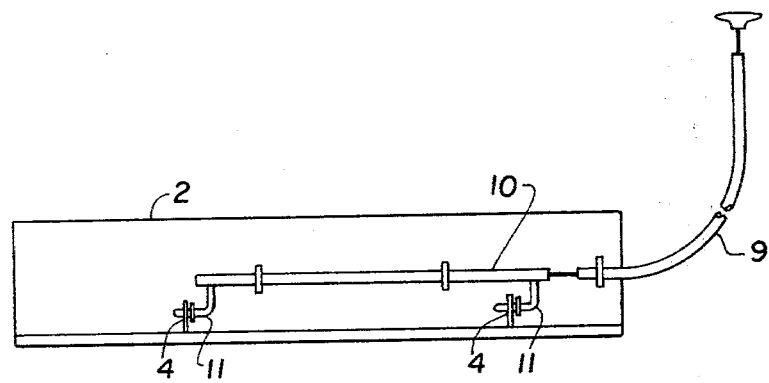

FIG. 3 FIG. 3 is a rear view of the fuel tank. The slidable shaft (I0) mounts the curved pins (II) which pass through respective eyelets (4) affixed to the rear of the tank and to the trap door. The slidable shaft (I0) is actuated remotely by the Pilot by means of a cable (9).

The Emergency Fuel Dump Device For Aircraft conforms essentially to the present art for aircraft wing and fuel tank arrangement. The Emergency Fuel Dump Device is unique in that construction for the bottom portion of the fuel tank and the portion of the underside of the wing below are constructed as one. It is made so as to allow the bottom portion of the fuel tank/wing to swing downward opening the entire bottom portion of the fuel tank to empty it of fuel.

The fuel tank of conventional dimensions, usually rectangular, is constructed with the bottom portion separate. It is affixed to the tank along the edge nearest the leading edge of the wing by continious hinge, and along the edge closest to the trailing edge of the wing by a quick release latch consisting of eyelet and pin arrangement. The bottom portion of the fuel tank is so constructed and molded so as to become the bottom portion of the wing on it's exterior surface. A gasket fitted along the door mates to the tank when the door is closed—thus providing a seal.

The rear of the door extends beyond the rear of the tank a short distance approximating 5%. On this extension portion, top surface, an eyelet is affixed (multiples as necessary) so as to extend up along the back wall of the fuel tank when the door is closed. On the back wall of the tank an eyelet is affixed (multiples as necessary) so as to line up with the eyelet on the door. A slidable pin is passed through the two eyelets thus latching the door closed. The slidable pin is curved 90 degrees and connected to a slidable shaft affixed to the rear of the tank. The slidable shaft is actuated by the pilot by means of a connecting cable. Such actuation of the slidable shaft thus removes the slidable pin from within the eyelets and door latch release is effected.

A motor and gear arrangement is located to the rear of the fuel tank. A bar with gear teeth on one face is mated to the gear on one surface and affixed to the door at one end. On release of the latch the motor is activated automatically and turns the gear which pushes the bar downward; thus the door is opened mechanically as well as by the weight of the fuel within. On remote actuation by the Pilot the motor—gear arrangement operates in reverse and the door is closed.

An object of this invention is to provide a means of dumping the weight of the fuel in minimum possible time in order to cope with a dire emergency, for example: loss of engine power during takeoff. Another object of the invention is to provide a means of fighting a wing fuel fire: i.e. by quickly dumping the fuel and in combination with the present art of fire fighting.

I claim:

1. A wing-fuel tank assembly comprising a bottom surface which forms the bottom of the tank and part of the underside exterior of said wing, said bottom surface being connected to a forward portion of said tank by a continuous hinge and arranged such that it swings downwardly into the airstream upon opening; said bottom surface having at least one eyelet along its rearward edge which mates with at least one eyelet affixed to the rear of said tank; a latch means in the form of a pin passing through said eyelets securing said bottom surface to said tank; means for removing said pin to release said bottom surface; motor and gear means attached to said wing rearwardly of said tank and said gear means mating with further gear means on a bar attached to said bottom surface for moving said bottom surface downwardly to open said tank and dump said fuel and moving upwardly to close said tank thus providing a continuous underside of the exterior of said wing after dumping of said fuel.

* * * * *